US008464835B2

(12) United States Patent  (10) Patent No.: US 8,464,835 B2
Munson  (45) Date of Patent: Jun. 18, 2013

(54) LUBRICANT SCOOP

(75) Inventor: John Munson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 852 days.

(21) Appl. No.: 12/192,294

(22) Filed: Aug. 15, 2008

(65) Prior Publication Data
US 2010/0038173 A1  Feb. 18, 2010

(51) Int. Cl.
F01D 25/18 (2006.01)
F01M 1/08 (2006.01)
F16N 25/04 (2006.01)

(52) U.S. Cl.
USPC .............. 184/6.11; 184/6.26; 184/14

(58) Field of Classification Search
USPC ........... 184/6.11, 6.26, 13.1, 26, 31; 384/465, 384/472, 473, 475; 415/110, 111, 112; 60/226.1, 785
See application file for complete search history.

(56) References Cited

U.S. PATENT DOCUMENTS

| 2,878,894 | A | | 3/1959 | Andrews |
| 3,195,682 | A | * | 7/1965 | Reneerkens ................. 184/11.1 |
| 4,342,489 | A | | 8/1982 | Lenz et al. |
| 4,648,485 | A | | 3/1987 | Kovaleski |
| 5,261,751 | A | * | 11/1993 | Heinz ........................... 384/466 |
| 5,904,427 | A | | 5/1999 | Braun et al. |
| 6,200,037 | B1 | | 3/2001 | Braun |
| 6,409,464 | B1 | | 6/2002 | Fisher et al. |
| 6,682,222 | B2 | | 1/2004 | Fisher |
| 7,244,096 | B2 | | 7/2007 | Dins et al. |
| 2003/0039421 | A1 | | 2/2003 | Fisher et al. |
| 2003/0079478 | A1 | * | 5/2003 | Romani .......................... 60/785 |
| 2006/0263202 | A1 | | 11/2006 | Dins et al. |
| 2009/0034892 | A1 | * | 2/2009 | Akamatsu et al. ............ 384/473 |

FOREIGN PATENT DOCUMENTS

| DE | 1 030 637 | 5/1958 |
| JP | 2000-249151 A | 9/2000 |
| JP | 2001-099167 A | 4/2001 |

OTHER PUBLICATIONS

Japanese Abstract, JP 2000-249151A.
Japanese Abstract, JP 2001-099167A.
European Search Report, EP 09251883.6, Feb. 16, 2011, Rolls-Royce Corporation.
EPO Machine Translation, DE 1030637, Jan. 6, 2012.

* cited by examiner

Primary Examiner — William E Dondero
Assistant Examiner — Robert T Reese
(74) Attorney, Agent, or Firm — Krieg DeVault LLP

(57) ABSTRACT

A lubricant scoop is disclosed herein. The lubricant scoop comprises an annular body encircling a central axis. The annular body is operable to rotate about the central axis in a first direction. The lubricant scoop also comprises a plurality of lubricant passageways defined in the annular body. Each of the plurality of passageways extends radially inward toward the central axis from respective entry ports to respective exit ports. The lubricant scoop also comprises an entry plenum defined in the annular body. The entry plenum is upstream of and fluidly communicates with each of the plurality of passageways. The entry plenum has an upstream opening operable to receive lubricant from a lubricant spray nozzle.

18 Claims, 3 Drawing Sheets

LUBRICANT SCOOP

BACKGROUND OF THE INVENTION

1. Field of the Invention

The invention relates to a structure for receiving a spray of lubricant and for directing the received lubricant axially and radially relative to an axis of rotation.

2. Description of Related Prior Art

A lubricant scoop is used to direct lubricant axially along a rotating shaft and also radially relative to the axis of rotation. Lubricant scoops are useful when other structures adjacent to the shaft render the component requiring lubrication inaccessible. The lubricant scoop receives a radially-directed stream of lubricant from a jet or spray orifice and redirects the lubricant axially.

It has been found that it is most efficient to lubricate high speed bearings by introducing lubrication through the ID (inside diameter) of the bearing and letting it flow radially outwards. This is normally accomplished by directing a stream of lubricating oil under a projection attached to a rotating shaft and letting the oil run along the shaft ID under the influence of the high G field that results from shaft rotation. Situations occasionally arise that either make the end of the shaft inaccessible or the open end is at a larger radius than the component that requires lubrication. It that case a lubricant scoop is useful to capture oil from a jet and move it radially inward to accomplish ID oiling of the component.

SUMMARY OF THE INVENTION

In summary, the invention is a lubricant scoop. The lubricant scoop comprises an annular body encircling a central axis. The annular body is operable to rotate about the central axis in a first direction. The lubricant scoop also comprises a plurality of lubricant passageways defined in the annular body. Each of the plurality of passageways extends radially inward toward the central axis from respective entry ports to respective exit ports. The lubricant scoop also comprises an entry plenum defined in the annular body. The entry plenum is upstream of and fluidly communicates with each of the plurality of passageways. The entry plenum has an upstream opening operable to receive lubricant from a lubricant spray nozzle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

Lubricant sprayed through a lubricant nozzle possesses momentum in the direction of spray. Momentum is a quantity relating to the motion of a body, such as a droplet of lubricant, and is equal to the product of the mass of the body and its velocity. Velocity is a quantity defined as the time rate of change of the position of the body in a specified direction. Velocity thus changes when the direction of movement of the body changes, unless some other force is applied to the body. Furthermore, velocity changes result in changes to the momentum of the body.

The exemplary embodiment of the present invention takes advantage of the momentum generated by spraying the lubricant from a lubricant nozzle in order to move the lubricant through a lubricant scoop. Advantages provided by the exemplary embodiment of the present invention in a turbine engine are set forth below. Alternative embodiments of the invention can be practiced to in different operating environments to realize similar or different benefits. It is noted that the benefits articulated herein may not be realized in all operating environments for all embodiments of the invention. Furthermore, it is noted that the benefits articulated herein are not exhaustive, other benefits may be perceived in the practice of the exemplary embodiment or in the practice of alternative embodiments of the invention. The benefits associated with the exemplary embodiment and described herein are not limitations of the broader invention, but rather demonstrate industrial applicability.

Figure 1:
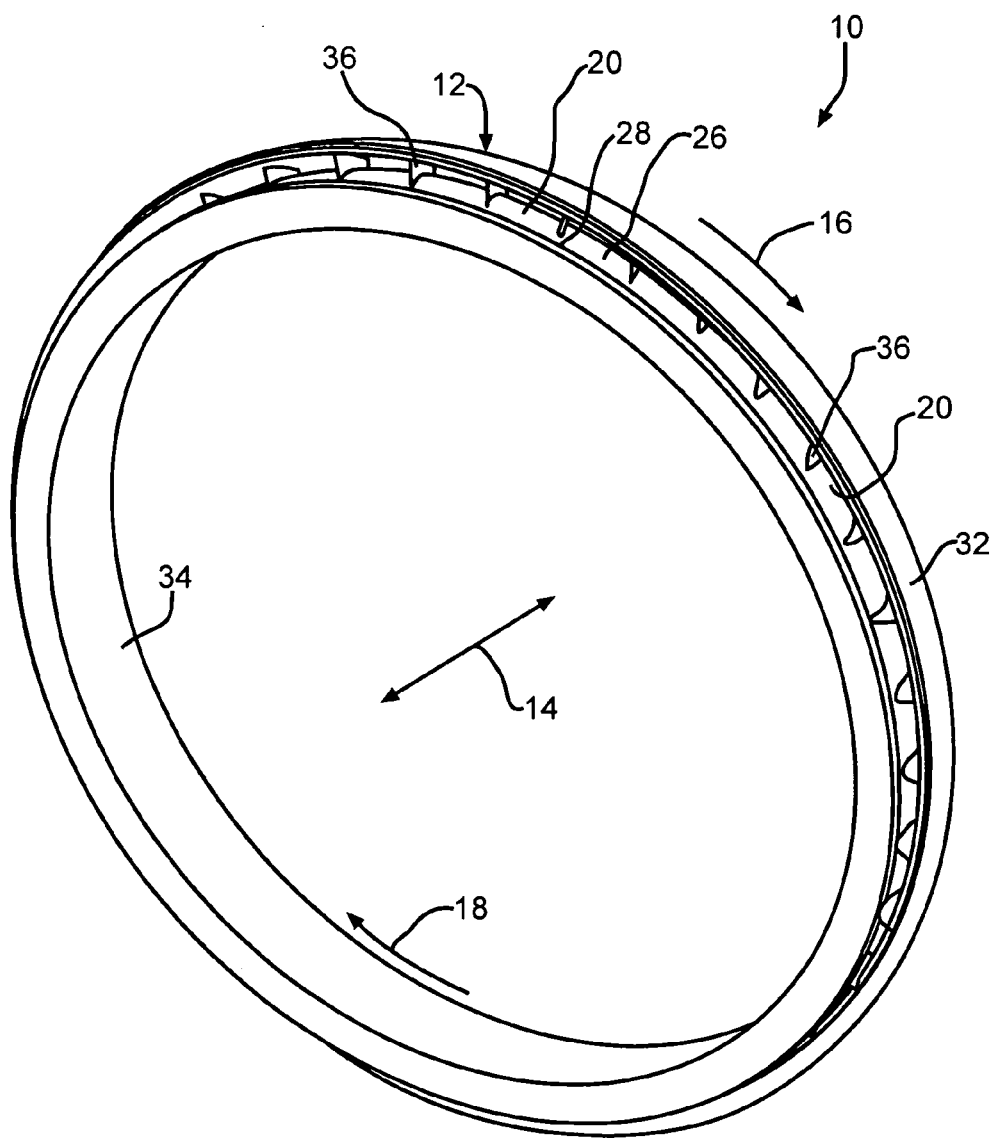
FIG. 1 is a perspective view of a lubricant scoop according to an exemplary embodiment of the invention.
Figure 2:
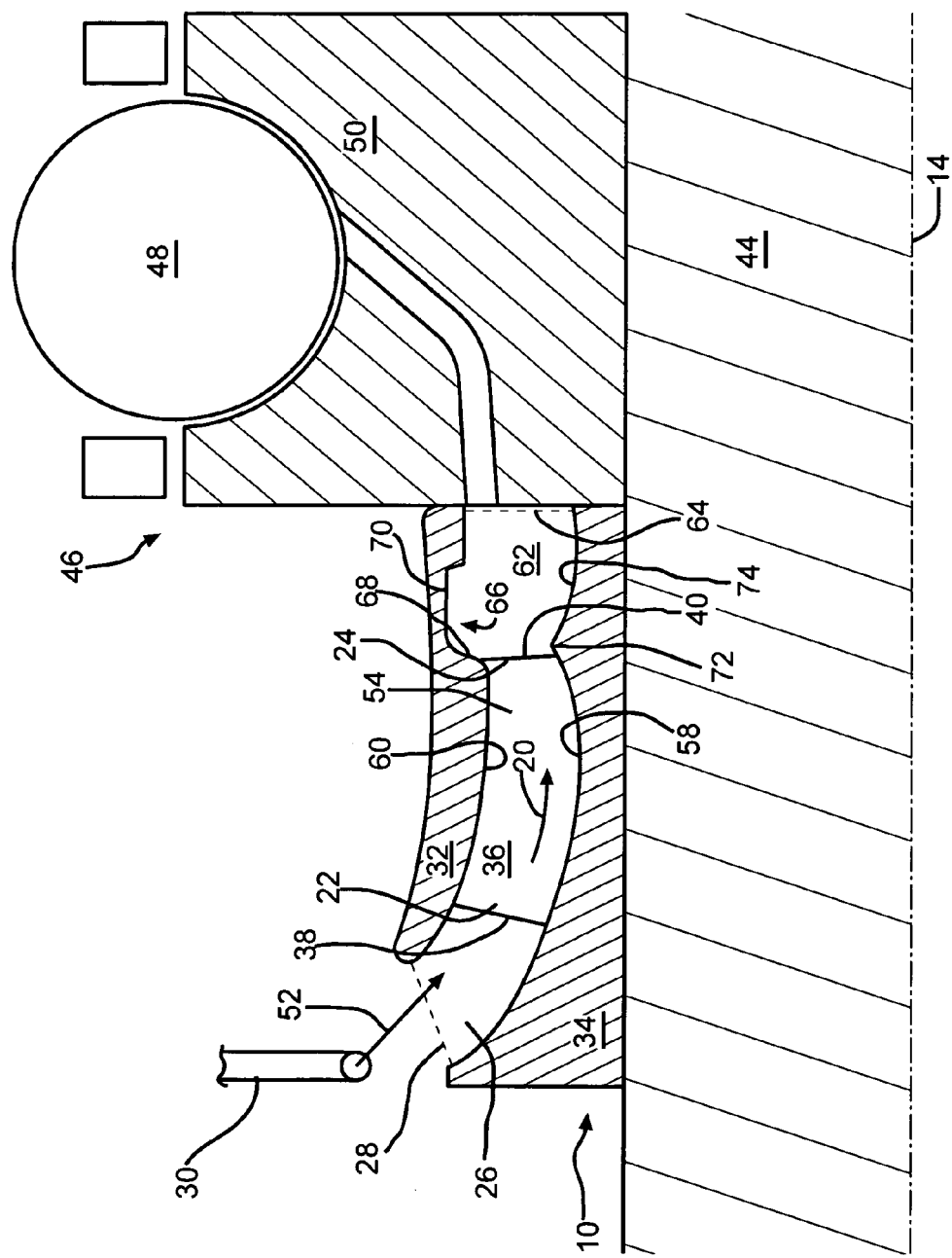
FIG. 2 is a cross-sectional view taken along an axis of rotation of a shaft in a turbine engine incorporating the exemplary embodiment of the invention.

FIG. 1 is a perspective view of a lubricant scoop 10 according to an exemplary embodiment of the invention. The lubricant scoop 10 comprises an annular body 12 encircling a central axis 14. The annular body 12 is operable to rotate about the central axis 14 in a first direction, represented by arrows 16 and 18. The lubricant scoop 10 also comprises a plurality of lubricant passageways 20 defined in the annular body 12. Referring now to FIG. 2, each of the plurality of passageways 20 extend radially inward toward the central axis 14 from respective entry ports 22 to respective exit ports 24. The lubricant scoop 10 also comprises an entry plenum 26 defined in the annular body 12. The entry plenum 26 is upstream of and fluidly communicates with each of the plurality of passageways 20. The entry plenum 26 has an upstream opening 28 operable to receive lubricant from a lubricant spray nozzle 30. The upstream opening 28 is shown in dashed line in FIG. 2

FIGS. 1 and 2 show that the exemplary the lubricant scoop 10 can be formed with a first ring 32 centered on the central axis 14. The exemplary lubricant scoop 10 can also include a second ring 34 concentric with and spaced radially inward from the first ring 32. A plurality of vanes 36 can individually extend radially between the first and second rings 32, 34. The plurality of vanes 36 can also extend axially along the central axis 14. An individual passageway 20 is defined between two adjacent vanes 36. FIG. 2 shows a single vane 36 extending between a leading edge 38 and a trailing edge 40. An entry port 22 is defined between adjacent leading edges 38 of two vanes 36. FIG. 2 also shows that the entry plenum 26 can extend radially between the first and second rings 32, 34 and axially along the central axis 14 between the upstream opening 28 and the leading edge 38 of the vane 36. The opening 28 is shown in dash line in FIG. 2 since it references the plane of the opening into the capture area.

The exemplary lubricant scoop 10 can be incorporated in a turbine engine. However, both the exemplary embodiment and the broader invention can be practiced in other operation environments. The turbine engine can include a shaft 44 operable to rotate about the axis 14 in a first angular direction. The first angular direction is the same direction as the first direction represented by arrows 16 and 18. With respect to the perspective of FIG. 2, the first direction implies that the illustrated structures above the axis 14 are coming out of the page. The turbine engine can also include a component 46 mounted to the shaft 44. The illustrated component 46 is a bearing with a rolling sphere 48 and an inner race 50 mounted to rotate with the shaft 44. However, in alternative embodiments of the invention, the component can be a gear, a different configuration of bearing, a seal runner, or any other structure which is to receive lubricant during operation.

The lubricant scoop 10 can be mounted to rotate with the shaft 44 and be positioned adjacent to the component 46. The lubricant scoop 10 can be directly adjacent to the component 46, as shown, or can be spaced from the component 46 in alternative embodiments of the invention. The lubricant nozzle 30 can be oriented to direct lubricant in a first rectilinear direction, represented by arrow 52.

In operation, as the shaft 44 and the lubricant scoop 10 rotate about the axis 14, the lubricant nozzle 30 can direct lubricant in the first rectilinear direction represented by arrow 52 across an open space and through the upstream opening 28. The first rectilinear direction represented by arrow 52 includes a first directional component along the axis 14 and a second directional component toward the axis 14. As best shown in FIG. 1, the upstream opening 28 extends 360 degrees about the central axis 14. The exemplary lubricant scoop 10 can thus continuously collect lubricant; no structure blocks lubricant at any point during rotation of the exemplary embodiment of the invention. Alternative embodiments of the invention can include a discontinuous upstream opening if operating considerations indicate a discontinuous upstream opening is desirable.

The upstream opening 28 can be transverse to the central axis 14. In other words, the dash line representing the upstream opening 28 in FIG. 2, if extended, would intersect the axis 14 in the plane of FIG. 2. Transverse means non-parallel, either perpendicular or at an angle less then ninety degrees. The orientation of the upstream opening 28 and the first rectilinear direction represented by arrow 52 allows the lubricant scoop 10 to receive lubricant possessing momentum in the axial direction. Thus, the axial momentum of the lubricant generated by spraying is applied to move the lubricant through the lubricant scoop 10.

Figure 3:
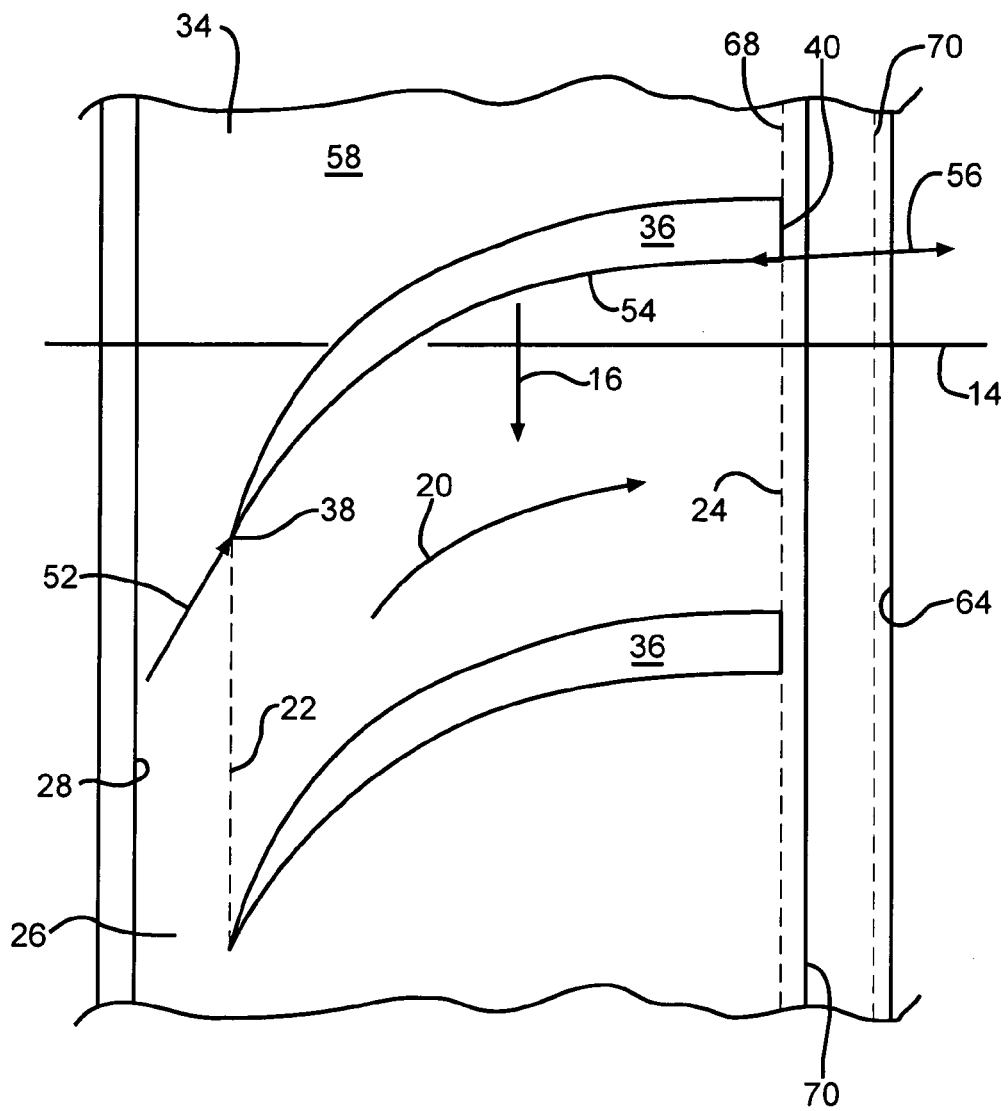
FIG. 3 is a cut-away view of the exemplary embodiment of the invention.

After passing through the upstream opening 28, the lubricant can collide with one of the surfaces defining the passageway 20, a surface defining the entry plenum 26, or a leading edge 38 of one of the vanes 36. FIG. 2 shows the first rectilinear direction represented by arrow 52 in a first plane and FIG. 3 shows the first rectilinear direction represented by arrow 52 in a second plane perpendicular to the first plane. The view in FIG. 3 is of the lubricant scoop 10 with the first ring 32 removed and the second ring 34 laid flat to enhance clarity. A first vane 36 is shown relative to the axis 14 of rotation and a second vane 36 is shown for reference.

FIG. 3 shows that the vanes 36 can be airfoil-shaped in radial cross-section, with the leading edge 38 and the trailing edge 40 and a concave surface 54 facing the first angular direction represented by arrow 16. The vanes 36 can be generally arcuate in radial cross-section in that the leading edges 38 and the trailing edges 40 of each of the plurality vanes 36 are circumferentially spaced from one another. Again, based on the viewing perspective, the circumference of the second ring 34 extends vertically in FIG. 3.

The concave surface 54 is a first side surface of an individual passageway 20. At the leading edge 38 or respective entry port 22, the surface 54 can be transverse to the central axis 14. The surface 54 can be shaped at the leading edge 38 such that the first rectilinear direction represented by arrow 52 is tangent to the concave surface 54 at the leading edge 38. Because the vane 36 is continuously moving, the first rectilinear direction represented by arrow 52 is intermittently tangent to the concave surface at the leading edge 38. The concave surface 54 can be substantially parallel to the axis 14 of rotation at the trailing edge 40, the line 56 being tangent to the concave surface 54 at the trailing edge 40.

The lubricant spray received on the concave surface 54 can follow the curvature of the concave surface 54 and be moved along the axis 14, redirected from movement in a partially axial direction to movement in a substantially fully axial direction. Lubricant received at the leading edge 38 will experience a less abrupt change of direction than lubricant received on the concave surface 54 aft of the leading edge 38, thereby conserving a maximum amount of momentum. However, all of the lubricant received on the concave surface 54 can be redirected to more axial movement without losing all momentum.

The portion of lubricant spray not received by the concave surface 54 will contact a radially outer surface 58 of the second ring 34. As best seen in FIG. 2, the surface 58 is arcuate and transverse to the first rectilinear direction represented by arrow 52. Similar to the concave surface 54, the surface 58 can be concave and can redirect lubricant to more axial movement.

The exemplary passageways 20 can narrow both radially and circumferentially along the central axis 14 between the respective entry port 22 and the respective exit port 24. The passageways 20 can thus build speed of the lubricant moving along the axis 14 and increase momentum.

Referring again to FIG. 2, due to rotation, the lubricant received in the lubricant scoop 10 will generally be urged radially outward. However, the shape of the exemplary passageways 20 can be enhanced to promote movement of the lubricant in the radially-inward direction. The first ring 32 can include a radially-innermost surface 60 acting as the radially-outermost surface of each passageway 20. The surface 60 can be convex to the axis 14 and be defined by a first radius of curvature. Movement of lubricant along the surface 60, from the entry port 22 to the exit port 24, is radially inward and is therefore movement against centrifugal forces. Therefore, the first radius of curvature can be relatively small or gentle. On the other hand, the concave surface 54 can define a second radius of curvature more aggressive than the first radius of curvature of the surface 60. As best seen by comparing FIGS. 2 and 3, the second radius of curvature of the surface 54 can be more aggressive than the first radius of curvature of the surface 60. Referring now to FIG. 3, based on the direction of rotation represented by the arrow 16, the shape of the surface 54 can encourage movement of lubricant toward the exit port 24. The surface 54 falls away in the direction of rotation and therefore lubricant will be induced to follow the surface 54 to the exit port 24. Thus, the shape of the passageway 20 applies the propensity of the lubricant to move relatively easier along the surface 54 towards moving the lubricant along the surface 60, which is relatively more difficult. The cooperation between the two surfaces 54, 60 can thus promote movement of the lubricant toward the axis 14.

It is noted that the various radii of curvature discussed herein need not be constant across the various surfaces for practicing the invention. Any of the various surfaces can be comprised of a plurality of discrete portions, each with a different radius of curvature. The exemplary embodiment simply offers one way of practicing the invention in which the side surface of the passageway falls circumferentially away from a leading edge at a greater rate than the top surface falls radially downward toward the axis of rotation.

Referring again to FIG. 2, the exemplary lubricant scoop 10 can also include an exhaust plenum 62 defined in the annular body 12 downstream of and fluidly communicating with each of the plurality of passageways 20. The exhaust plenum 62 can include a downstream opening 64 permitting lubricant to escape from the annular body 12.

The exhaust plenum 62 can also include an annular notch 66 facing the axis 14. The notch 66 can extend 360° around the axis and have a first, forward side wall 68 positioned adjacent to the exit ports 24 of the plurality of passageways 20. The notch 66 can also include a second, aft side wall 70 opposite the first side wall 68. The second side wall 70 can be shorter than the first side wall 68. In other words, the side wall 68 extends further toward the axis 14 than the side wall 70. In operation, the exemplary notch 66 can act as a catch basin, collecting lubricant falling radially outward over the edge defined by the intersection between the side wall 68 and the surface 60. Lubricant can be collected in the notch 66 to a circumferentially uniform pool height, stabilizing flow. Lubricant can overflow the notch 66 by passing over the aft side wall 70. Thus, the relative sizes of the side walls 68 and 70 can prevent backflow of the lubricant. The respective positions of the walls 68, 70 relative to the vanes 36 are shown in phantom line in FIG. 3.

The exemplary lubricant scoop 10 also provides additional structure to reduce the backflow of lubricant on the surface 58. FIG. 2 shows the surface 58 extending between the upstream opening 28 and a lip 72. The lip 72 is defined between the surface 58 and a radially-innermost surface 74 of the exhaust plenum 62. The surface 74 can be convex to the central axis 14 and abut the surface 58 along the axis 14. Lubricant moving along the surface 58 toward the exit port 24 can escape the surface 58 at the lip 72 and be collected in the notch 66. The surfaces 58, 74 can have at least one of different radii of curvature and/or different centers of curvature so that the lip 72 is relatively pronounced to encourage lubricant from escaping the surface 58. The surface 58 can have a greater radius of curvature than the surface 60 to induce separation of the lubricant from the surface 58.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Also, while this document may draw attention to certain features believed to be of particular importance, it should be understood that the Applicant claims protection in respect of any patentable feature or combination of features hereinbefore referred to and/ or shown in the drawings whether or not particular emphasis has been placed thereon.

What is claimed is:

1. A lubricant scoop comprising:
   an annular body encircling a central axis and operable to rotate about said central axis in a first direction; and
   a plurality of lubricant passageways defined in said annular body and extending radially inward toward said central axis from respective entry ports to respective exit ports; and
   an entry plenum defined in said annular body upstream of and fluidly communicating with each of said plurality of passageways, said entry plenum having an upstream opening operable to receive lubricant directly from a lubricant spray nozzle, wherein said scoop is operative to capture said lubricant over an arc of 360 degrees about the central axis.

2. The lubricant scoop of claim 1 wherein said upstream opening is transverse to said central axis.

3. The lubricant scoop of claim 1 wherein said annular body includes:
   a first ring centered on said central axis; a second ring concentric with and spaced radially inward from said first ring; and
   a plurality of vanes each extending radially between said first and second rings and extending axially along said central axis between respective leading edges and respective trailing edges,
   wherein said entry plenum extends radially between said first and second rings and axially along said central axis between said upstream opening and said leading edges of said plurality of vanes.

4. The lubricant scoop of claim 3 wherein each of said vanes includes a surface at least partially such that said leading edges and said trailing edges of each of said plurality vanes are circumferentially spaced from one another.

5. The lubricant scoop of claim 1 wherein at least one of said plurality of passageways narrows both radially and circumferentially along said central axis between said respective entry port and said respective exit port.

6. The lubricant scoop of claim 1 wherein at least one of said plurality of passageways includes:
   a radially-outermost surface being at least partially convex to said central axis and having a first radius of curvature; and
   a first side surface adjacent to said radially-outermost surface, said first side surface being at least partially concave and facing said first direction of rotation, said first side surface having a second radius of curvature smaller than said first radius of curvature.

7. The lubricant scoop of claim 6 wherein said first side surface is transverse to said central axis at said respective entry port and substantially tangent with said central axis at said respective exit port.

8. The lubricant scoop of claim 6 wherein at least one of said plurality of passageways includes:
   a radially-innermost surface being at least partially convex to said central axis having a third radius of curvature smaller than said first radius of curvature.

9. The lubricant scoop of claim 1 further comprising:
   an exhaust plenum defined in said annular body downstream of and fluidly communicating with each of said plurality of passageways, said exhaust plenum having a downstream opening permitting lubricant to escape from said annular body.

10. The lubricant scoop of claim 9 wherein said exhaust plenum further comprises:
    an annular notch facing said central axis and having a first side wall positioned adjacent to said exit ports of said plurality of passageways and second side wall opposite said first side wall, wherein said second side wall is shorter than said first side wall.

11. The lubricant scoop of claim 9 wherein:
    at least one of said plurality of passageways includes a first radially-innermost surface being at least partially convex to said central axis; and
    said exhaust plenum includes a second radially-innermost surface being at least partially convex to said central axis and abutting said first radially-innermost surface along said central axis, wherein said second radially-innermost surface and said first radially-innermost surface have at least one of different radii of curvature and different centers of curvature such that a lip is defined between said first and second radially-innermost surfaces.

12. A method for distributing lubricant in a sump housing comprising the steps of:
spraying lubricant in a first direction across an open space between a lubricant nozzle and a lubricant scoop rotating about an axis of rotation; and
orienting the lubricant nozzle such that the first direction across the open space is at least partially along the axis of rotation, wherein said scoop is operative to capture said lubricant over an arc of 360 degrees about the central axis.

13. The method of claim 12 further comprising the step of:
applying the axial momentum of the lubricant generated by said spraying step to move the lubricant through the lubricant scoop.

14. The method of claim 12 further comprising the step of:
collecting lubricant to a circumferentially uniform pool height in a circumferential groove defined in the lubricant scoop.

15. A turbine engine comprising:
a shaft operable to rotate about an axis in a first angular direction;
a component mounted to rotate with said shaft;
a lubricant scoop mounted to rotate with said shaft and adjacent to said component, said lubricant scoop including at least one vane being airfoil-shaped in radial cross-section with a leading edge and a trailing edge and a concave surface facing said first angular direction; and
a lubricant nozzle oriented to direct lubricant in a first rectilinear direction, wherein said first rectilinear direction is intermittently tangent to said concave surface at said leading edge as said lubricant scoop rotates about said axis of rotation, wherein said scoop is operative to capture said lubricant over an arc of 360 degrees about the central axis.

16. The turbine engine of claim 15 wherein said concave surface is substantially parallel to said axis of rotation at said trailing edge.

17. The turbine engine of claim 16 wherein said lubricant scoop further comprises:
a first ring centered on said axis of rotation; and
a second ring concentric with and spaced radially inward from said first ring, wherein said at least one vane interconnects said first and second rings and an entry plenum with an upstream opening is defined between said first and second rings upstream of said leading edge such that lubricant passes through said entry plenum prior to contacting said at least one vane.

18. A lubricant scoop, comprising:
an annular body disposed about a central axis and operable to rotate about said central axis;
a entry plenum defined in said annular body, said entry plenum being circumferentially continuous and having an opening operable to receive into said entry plenum lubricant from a lubricant discharge nozzle;
a plurality of vanes disposed within said annular body and configured to form therebetween a plurality of lubricant passageways, wherein said lubricant passageways are positioned to receive lubricant from said entry plenum; wherein said lubricant passageways extend from said entry plenum to respective exit ports; and wherein said exit ports are operable to discharge from said lubricant scoop lubricant received from said entry plenum via said plurality of lubricant passageways, wherein said scoop is operative to capture said lubricant over an arc of 360 degrees about the central axis.

* * * * *